(12) United States Patent
Munafo et al.

(10) Patent No.: US 11,003,153 B2
(45) Date of Patent: May 11, 2021

(54) SAFETY OPERATION CONFIGURATION FOR COMPUTER ASSISTED VEHICLE

(71) Applicant: Intel Corporation, Santa Clara, CA (US)

(72) Inventors: Tamir Damian Munafo, Naale (IL); Alexander Brill, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 15/816,534

(22) Filed: Nov. 17, 2017

(65) Prior Publication Data

US 2019/0049914 A1    Feb. 14, 2019

(51) Int. Cl.
*G05B 19/042* (2006.01)
*G05D 1/00* (2006.01)
*G07C 5/08* (2006.01)

(52) U.S. Cl.
CPC ........ *G05B 19/0428* (2013.01); *G05D 1/0088* (2013.01); *G07C 5/0816* (2013.01);
(Continued)

(58) Field of Classification Search
CPC ...... G05B 19/0428; G05B 2219/24024; G05B 2219/2637; G05D 1/0088; G07C 5/0816;
(Continued)

(56) References Cited

U.S. PATENT DOCUMENTS 6,295,612 B1 *  9/2001  Czuhai .............. G06F 11/2736
                                                      714/33
10,108,481 B1 * 10/2018 Kataria ................ G06F 11/073
(Continued)

FOREIGN PATENT DOCUMENTS

DE    102014225302 A1 *  6/2011

OTHER PUBLICATIONS

Bernon-Enjalbert, Valerie et al., "Safety-Integrated Hardware Solutions to Support ASIL-D Applications", Freescale Semiconductor White Paper, Document No. FUNCSAFTASILDWP REV 1, (c) 2013 Freescale Semiconductor, Inc., 9 pages (Year: 2013).*
(Continued)

*Primary Examiner* — Faris S Almatrahi
*Assistant Examiner* — David A Testardi
(74) *Attorney, Agent, or Firm* — Schwabe, Williamson & Wyatt, P.C.

(57) ABSTRACT

Embodiments include apparatuses, methods, and systems for computer assisted or autonomous driving. An apparatus may include a storage and a safety operation controller disposed in a computer assisted or autonomous driving vehicle. The storage may store a safety operation configuration and a list of safety operations to be performed on one or more device components. The safety operation configuration and the list of safety operations may be provided by a first party. The safety operation configuration may be used to configure selected ones of the list of safety operations by a second party different from the first party to obtain configured safety operations to be performed on the one or more device components. The safety operation controller may perform the configured safety operations on the one or more device components. Other embodiments may also be described and claimed.

23 Claims, 7 Drawing Sheets

(52) U.S. Cl.
CPC ............. *G05B 2219/24024* (2013.01); *G05B 2219/2637* (2013.01)

(58) Field of Classification Search
CPC .......... B60W 50/04; B60W 2050/041; B60W 2050/043; B60W 60/0015; B60W 60/00188; G01R 31/006; G01R 31/2834; G01R 31/31707; G01R 31/31722; G06F 11/2736
USPC ........................................................ 701/24
See application file for complete search history.

(56) References Cited

U.S. PATENT DOCUMENTS

| | | | |
|---|---|---|---|
| 10,169,177 B1* | 1/2019 | Shivaray | G06F 11/2284 |
| 10,466,705 B1* | 11/2019 | Garg | G06F 11/2284 |
| 2002/0053045 A1* | 5/2002 | Gillenwater | G06F 11/2273 |
| | | | 714/38.14 |
| 2005/0034041 A1* | 2/2005 | Casarsa | G01R 31/3004 |
| | | | 714/733 |
| 2008/0229151 A1* | 9/2008 | Ito | B60W 50/04 |
| | | | 714/37 |
| 2010/0213964 A1* | 8/2010 | Bogenberger | G01R 31/31727 |
| | | | 324/750.3 |
| 2012/0191400 A1* | 7/2012 | Sontakke | G01R 31/31724 |
| | | | 702/119 |
| 2013/0305228 A1* | 11/2013 | Black | G06F 11/3688 |
| | | | 717/131 |
| 2014/0200699 A1* | 7/2014 | Vincelli | G06F 11/008 |
| | | | 700/105 |
| 2016/0268007 A1* | 9/2016 | Jones | G11C 29/42 |
| 2016/0314065 A1* | 10/2016 | Chirgwin | G06F 11/3672 |
| 2017/0139411 A1* | 5/2017 | Hartung | G05D 1/0077 |
| 2017/0205462 A1* | 7/2017 | Mukherjee | G01R 31/31855 |
| 2018/0059759 A1* | 3/2018 | Umemoto | G06F 1/26 |
| 2018/0101458 A1* | 4/2018 | Kumar | G06F 11/2236 |
| 2018/0145041 A1* | 5/2018 | Fkih | G01R 31/2851 |
| 2018/0180672 A1* | 6/2018 | Maeda | G01R 31/31725 |
| 2018/0231609 A1* | 8/2018 | Jain | G01R 31/2851 |
| 2018/0281816 A1* | 10/2018 | Otsuka | B60R 16/02 |
| 2019/0340116 A1* | 11/2019 | Miyauchi | G06F 11/3692 |

OTHER PUBLICATIONS

Bernardi, Paolo et al., "Development flow for on-line core self-test of automotive microcontrollers", IEEE Transactions on Computers, vol. 65 No. 3, Mar. 2016, pp. 744 to 754 (Year: 2016).*
U.S. Appl. No. 62/458,534, filed Feb. 13, 2017, 43 pages (Year: 2017).*
Chitnis, Kedar et al., "Enabling Functional Safety ASIL Compliance for Autonomous Driving Software Systenns",IS&T International Symposium on Electronic Imaging 2017, Autonomous Vehicles and Machines 2017, Conference Date: Jan. 29-Feb. 2, 2017, pp. 35 to 40 (Year: 2017).*
Eychenne, Ch. et al., "An Effective Functional Safety Infrastructure for System-on-Chips", 2017 IEEE 23rd International Symposium on On-Line Testing and Robust System Design (IOLTS), Date of Conference: Jul. 3-5, 2017, pp. 63 to 66 (Year: 2017).*
Kogan, T. et al., "Advanced Functional Safety Mechanisms for Embedded Memories and IPs in Automotive SoCs", 2017 IEEE International Test Conference (ITC), Oct. 31-Nov. 2, 2017, Fort Worth, TX, 2017, pp. 1-6 (Year: 2017).*
Sargsyan, David, "ISO 26262 Compliant Memory Bist Architecture", 2017 Computer Science and Information Technologies (CSIT), Date of Conference: Sep. 25-29, 2017, pp. 78 to 82 (Year: 2017).*
Tshagharyan, G. et al., "An effective functional safety solution for automotive systems-on-chip," 2017 IEEE International Test Conference (ITC), Oct. 31-Nov. 2, 2017, Fort Worth, TX, 2017, pp. 1-10 (Year: 2017).*
Write.com forum post, "The use of whether/or", downloaded Apr. 8, 2015, 2 pages (Year: 2015).*

* cited by examiner

SAFETY OPERATION CONFIGURATION FOR COMPUTER ASSISTED VEHICLE

FIELD

Embodiments of the present disclosure relate generally to the technical fields of computing, computer assisted or autonomous driving, and more particularly to safety operations for a computer device in a computer assisted or autonomous driving vehicle.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Functional safety is an important consideration for computer assisted or autonomous driving vehicles and many other applications. Various standard bodies, e.g., the International Organization for Standardization (ISO), have developed standards for the computer assisted or autonomous driving vehicle industry. For example, the ISO 26262 standard, titled "Road vehicles—Functional safety," is an international standard for functional safety of electrical and/or electronic systems in computer assisted or autonomous driving vehicles. The ISO 26262 standard may specify various safety levels, e.g., Automotive Safety Integrity Level (ASIL) A, B, C or D. Original equipment manufacturers (OEMs) may have the flexibility to meet the various ASIL levels of the ISO 26262 standard. The flexibility for the OEMs may post challenges for product providers to meet the different ASIL levels of the ISO 26262 standard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
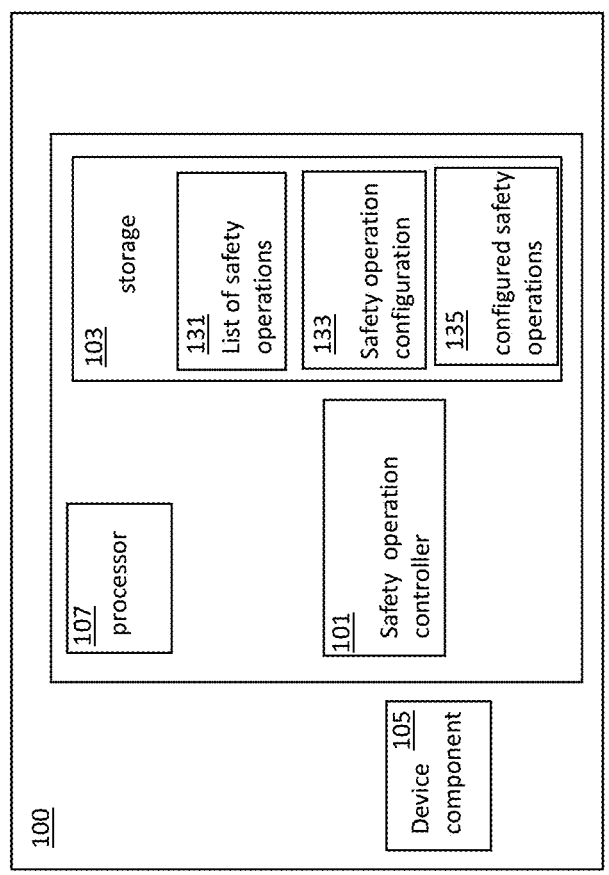
FIG. 1 illustrates an example apparatus for computer assisted or autonomous driving, where the apparatus includes a safety operation controller and a safety operation configuration, in accordance with various embodiments.

A computer assisted or autonomous driving vehicle may include many device components manufactured by different parties. Functional safety is an important consideration for computer assisted or autonomous driving vehicles. In order to meet the various safety levels, e.g., Automotive Safety Integrity Level (ASIL) A, B, C or D, specified in the ISO 26262 standard, device components in a computer assisted or autonomous driving vehicle may be developed by a long, strict, and structured process. Often the device components may not be flexible and cannot be easily changed without compromising the safety operations.

Embodiments herein may present a modular safety operation infrastructure including a safety operation controller, a safety operation configuration, and a list of safety operations to be performed on one or more device components of a computer assisted or autonomous driving vehicle. The safety operation configuration and the list of safety operations may be provided by a first party. The safety operation configuration may be used to configure selected ones of the list of safety operations by a second party different from the first party to obtain configured safety operations to be performed on the one or more device components. In embodiments, the first party may provide the various device components, while the second party may utilize the device components and configure the safety operations of the device components without changing the device components. For example, the modular safety operation infrastructure, including the safety operation controller, the safety operation configuration, and the list of safety operations may provide original equipment manufacturers (OEMs) a solution to configure functional safety policies without changing the system code and without compromising the safety level. An OEM may configure their functional safety solution as they see fit, monitor their environment and operate accordingly without changing the safety operations themselves. Such a safety operation infrastructure may reduce the time for development, integration, and debug and field support for the OEMs. Even though the modular safety operation infrastructure herein is presented for computer assisted or autonomous driving vehicles, it may be applicable to other industrial functional safety systems as well.

In embodiments, an apparatus for computer assisted or autonomous driving may include a storage and a safety operation controller disposed in a computer assisted or autonomous driving vehicle. The storage may store a safety operation configuration and a list of safety operations to be performed on one or more device components of the computer assisted or autonomous driving vehicle. The safety operation configuration and the list of safety operations may be provided by a first party. The safety operation configuration may be used to configure selected ones of the list of safety operations by a second party different from the first party to obtain configured safety operations to be performed on the one or more device components. The safety operation controller may perform the configured safety operations on the one or more device components in accordance with the configured safety operations.

In embodiments, a method for safety operations for computer assisted or autonomous driving may include: providing, by a first party, a safety operation configuration and a list of safety operations to be performed on one or more device components of a computer assisted or autonomous driving vehicle; configuring, by a second party different from the first party through the safety operation configuration, selected ones of the list of safety operations to obtain configured safety operations to be performed on the one or more device components. The method may further include more operations performed by a safety operation controller: performing the configured safety operations on the one or more device components; monitoring a failure from the one or more device components; receiving an error message from the one or more device components; responding to the error message; performing recovery from the failure; and notifying a host or a platform processor coupled to the safety operation controller the failure based on the error message.

In embodiments, an apparatus for computer assisted or autonomous driving may include a storage and a safety operation controller disposed in a computer assisted or autonomous driving vehicle. The storage may store a safety operation configuration and a list of safety operations to be performed on one or more device components of the computer assisted or autonomous driving vehicle. The safety operation configuration and the list of safety operations may be provided by a first party. The safety operation configuration may be used to configure selected ones of the list of safety operations by a second party different from the first party to obtain configured safety operations to be performed on the one or more device components. The safety operation controller may perform the configured safety operations on the one or more device components in accordance with the configured safety operations. The safety operation controller may include a safety operation scheduler and an error handler. The safety operation scheduler may perform the configured safety operations on the one or more device components, receive an error message from the one or more device components, and monitor a failure from the one or more device components. In addition, the error handler may respond to the error message, perform recovery from the failure, and notify a host or a platform processor the failure based on the error message.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example apparatus 100 for computer assisted or autonomous driving, where the apparatus 100 may include a safety operation controller 101 and a safety operation configuration 133, in accordance with various embodiments. For clarity, features of the apparatus 100, the safety operation controller 101, and the safety operation configuration 133 may be described below as an example for understanding an example apparatus for computer assisted or autonomous driving, a safety operation controller, and a safety operation configuration. It is to be understood that there may be more or fewer components included in the apparatus 100, the safety operation controller 101, and the safety operation configuration 133. Further, it is to be understood that one or more of the devices and components within the apparatus 100, the safety operation controller 101, and the safety operation configuration 133 may include additional and/or varying features from the description below, and may include any devices and components that one having ordinary skill in the art would consider and/or refer to as the devices and components of an apparatus for computer assisted or autonomous driving, a safety operation controller, and a safety operation configuration.

Figure 7:
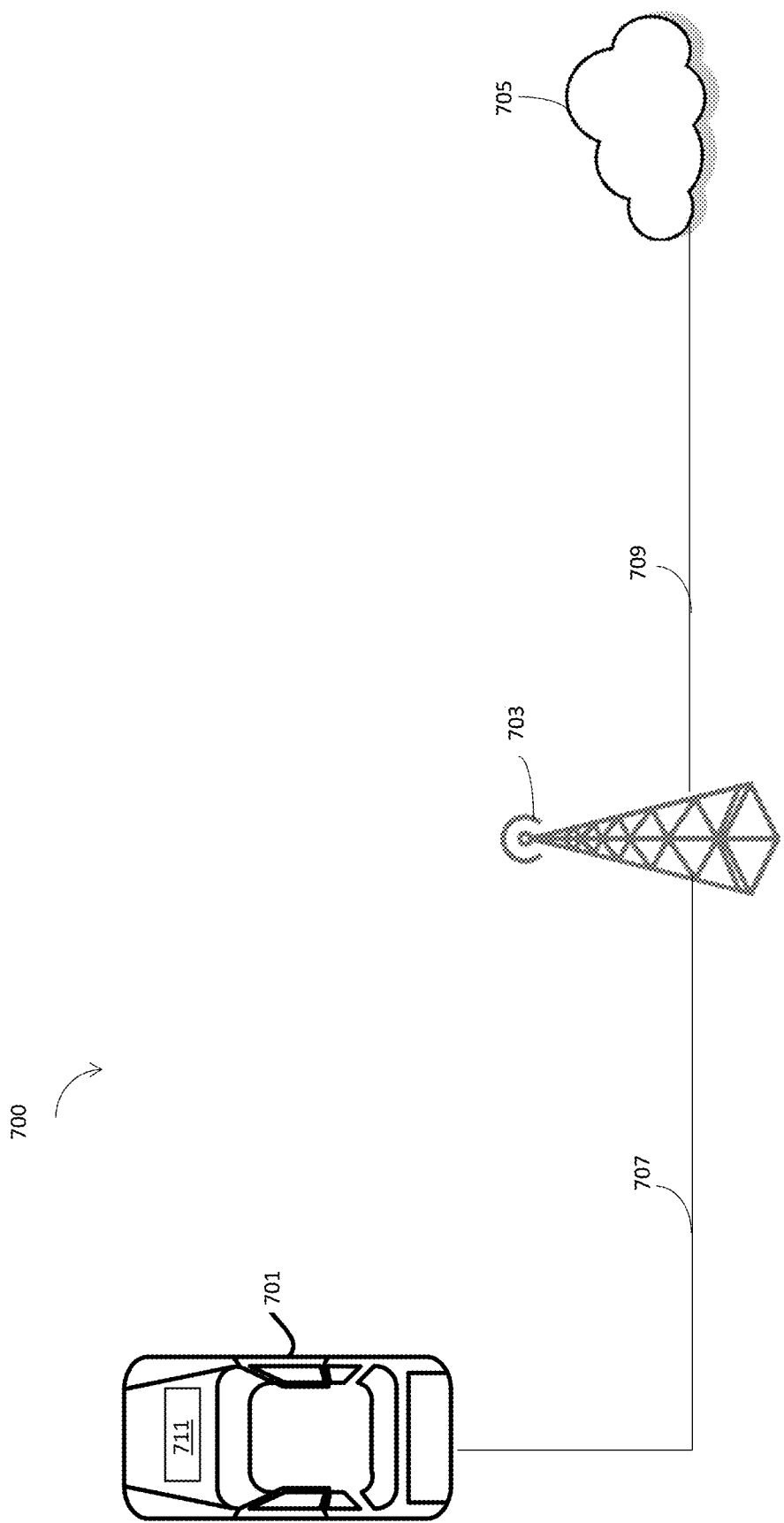
FIG. 7 illustrates an environment in which various embodiments described with references to FIGS. 1-6 may be practiced.

In embodiments, the apparatus 100 for computer assisted or autonomous driving may include the safety operation controller 101 and a storage 103 to store the safety operation configuration 133. The storage 103 may be a replaceable flash memory coupled to the safety operation controller 101. In addition, the apparatus 100 may include a device component 105, and a processor 107. The apparatus 100, including the storage 103 and the safety operation controller 101, may be disposed in a computer assisted or autonomous driving vehicle, e.g., a computer assisted or autonomous driving vehicle 701 as shown in FIG. 7.

The storage 103 may include the safety operation configuration 133 and a list of safety operations 131, which are to be performed on one or more device components of a computer assisted or autonomous driving vehicle, e.g., the device component 105. The safety operation configuration 133 and the list of safety operations 131 may be provided by a first party. The safety operation configuration 133 may be used to configure selected ones of the list of safety operations 131 by a second party different from the first party to obtain configured safety operations 135 to be performed on the one or more device components, e.g., the device component 105. The configured safety operations 135 may be stored in the storage 103 as well. The safety operation controller 101 may perform the configured safety operations 135 on the one or more device components in accordance with the configured safety operations.

In embodiments, the list of safety operations 131 may include memory built-in-self-test (MBIST) operations, logic built-in-self-test (LBIST) operations, error injection operations, voltage monitoring operations, temperature monitoring operations, clock monitoring operations, software redundancy operations, software test libraries operations, or any other safety operations.

In embodiments, the safety operation configuration 133 may be provided by a first party as an application programming interface (API). The safety operation configuration 133 may be used by a second party to enable or disable certain safety operations of the list of safety operations 131 to obtain the configured safety operations 135. Therefore, the second party can configure the safety operations through the safety operation configuration 133 without going through the details of the code of device components, hence maintaining the integrity of the device components. For example, through the safety operation configuration 133, the second party may turn off safety operations on the device component 105.

In embodiments, the configured safety operations 135 may include or exclude selected ones of the list of safety operations 131. For example, the configured safety operations 135 may exclude safety operations of a device component from the list of safety operations 131, when the device component may be turned off. The configured safety operations 135 may further include a configured safety operation added to the list of safety operations 131 by the second party using the safety operation configuration 133.

In embodiments, the safety operation controller 101 may be implemented as software operated on the processor 107. In some other embodiments, the safety operation controller 101 may be implemented in circuitry, such as FPGA, an ASIC, or other dedicated processor or processor core. The safety operation controller 101 may perform the configured safety operations 135 on the one or more device components in accordance with the configured safety operations, e.g., the device component 105. In addition, the safety operation controller 101 may monitor a failure from the one or more device components, receive an error message from the one or more device components, respond to the error message, perform recovery from the failure, and notify a host or a platform processor the failure based on the error message.

In embodiments, the processor 107 may include one or more central processing unit (CPUs). In some embodiments, the processor 107, in addition to the one or more CPUs, may include a programmable device (such as a hardware accelerator or a FPGA) that may implement the safety operation controller 101. In embodiments, the processor 107 may be a microcontroller, a 16-bit processor, a 32-bit processor, a 64-bit processor, a single core processor, a multi-core processor, a digital signal processor, an embedded processor, or any other processor.

In embodiments, the device component 105 may include a central processing unit (CPU), a direct memory access (DMA), a faultRobust network (FRNET), a universal asynchronous receiver-transmitter (UART), a general-purpose input/output (GPIO), a serial peripheral interface (SPI), an inter-integrated circuit (I2C), a camera, an embedded MultiMediaCard (EMMC), a voltage monitor, a clock monitor, or a temperature monitor. The device component 105 may be ASIL-D certificated. In some other embodiments, there may be more device components coupled to the safety operation controller 101, as shown in FIG. 2.

In embodiments, the apparatus 100 may be a system on chip (SoC), integrating the device component 105, the processor 107, the storage 103, and the safety operation controller 101. The apparatus 100 may further include cache, random access memory (RAM), peripheral functions, or other functions onto one chip. Alternatively, the apparatus 100 may be a system integrated on a same circuit board to include the device component 105, the processor 107, the storage 103, the safety operation controller 101, and other components. The apparatus 100 may be for various applications such as wireless communication, digital signal processing, security, and other applications. For example, the apparatus 100 may be a VECD, an ECU, an in-vehicle navigation system, a wearable device, a smartphone, a computer tablet, a laptop, a game controller, a set-top box, an infotainment console, an IoT device, or others.

Figure 2:
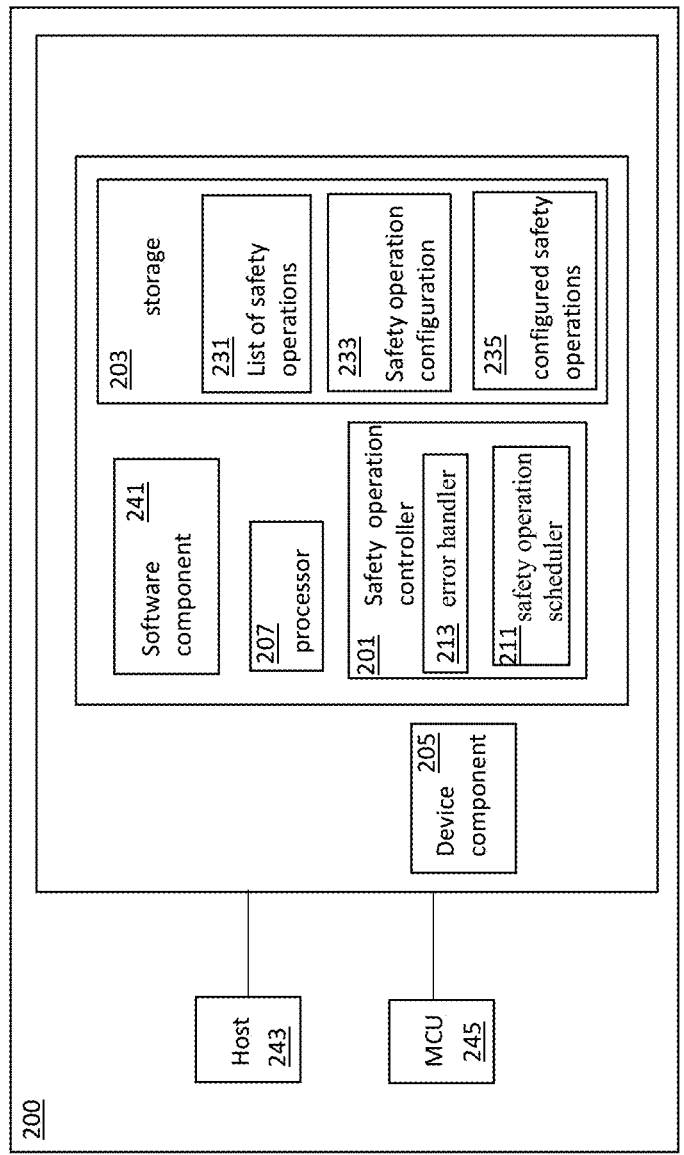
FIG. 2 illustrates another example apparatus for computer assisted or autonomous driving, where the apparatus includes a safety operation controller and a safety operation configuration, in accordance with various embodiments.
Figure 3:
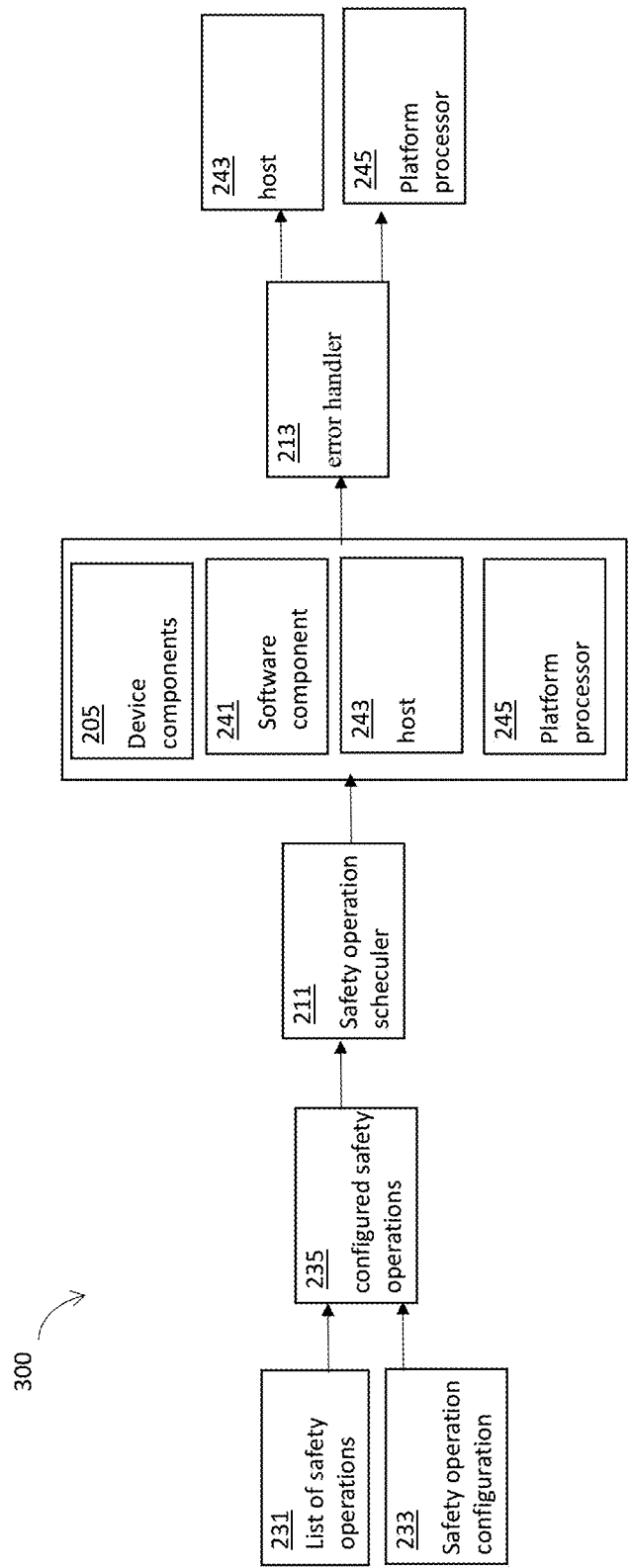
FIG. 3 illustrates an example process for safety operations to be performed by an apparatus for computer assisted or autonomous driving, in accordance with various embodiments.

FIG. 2 illustrates another example apparatus 200 for computer assisted or autonomous driving, where the apparatus 200 may include a safety operation controller 201 and a safety operation configuration 233, in accordance with various embodiments. FIG. 3 illustrates an example process 300 for safety operations to be performed by the apparatus 200. The apparatus 200, the safety operation controller 201, and the safety operation configuration 233 may be similar to the apparatus 100, the safety operation controller 101, and the safety operation configuration 133, as shown in FIG. 1.

In embodiments, the apparatus 200 for computer assisted or autonomous driving may include the safety operation controller 201 and a storage 203 to store the safety operation configuration 233 and a list of safety operations 231. In addition, the apparatus 100 may include a device component 205, a device component 241, a device component 243, a device component 245, and a processor 207. The apparatus 200, including the storage 203, the safety operation controller 201, the device component 205, the device component 241, the device component 243, the device component 245, and the processor 207 may be disposed in a computer assisted or autonomous driving vehicle. The safety operation controller 201 may include a safety operation scheduler 211 and an error handler 213.

In embodiments, the device component 205 and the safety operation controller 201 may be on a same system-on-chip (SoC), and the device component 205 may be an intellectual property (IP) core integrated on the SoC. In some other embodiments, there may be more than one device components, e.g., more IP cores, integrated on the SoC. In addition, the device component 241 may be a software component to be operated on the safety operation controller 201, the device component 243 may be a host, and the device component 245 may be a platform processor. The device component 243, e.g., a host, and the device component 245, e.g., a platform processor, may be on a same circuit board as the safety operation controller 201.

In embodiments, the device component 205, the device component 241, the device component 243, or the device component 245 may include one or more device components selected from a CPU, a DMA, a FRNET, a UART, a GPIO, a SPI, an I2C, a camera, an EMMC, a voltage monitor, a clock monitor, or a temperature monitor. The the device component 205, the device component 241, the device component 243, or the device component 245 may be ASIL-D certificated.

In embodiments, the safety operation configuration 233 may include a data structure with various fields, such as an identification (ID), an enable, an error severity, a fail mode, an execution mode, an execution period, an execution time limit, a recovery time limit, a threshold, a notification, and any other information or arguments field. For example, the following table may present more details, where B represents a byte, MCU represents a platform processor.

| Field Name | Size | Possible values | Description |
| --- | --- | --- | --- |
| ID | 4B | Positive integer | The ID of the safety operations. |
| Enable | 1B | [True, False] | True if the test is enabled. |
| Error Severity | 2B | [Critical error, normal error, warning, information] | The severity of the failure of the safety operation, may include a critical error, a normal error, a warning, or an information. |
| Fail Mode | 1B | [operational, safe] | If operational, then try to recover the failing safety operation. |
| Recovery | 1B | [default, user] | Recovery by default or by user intervention. |
| Execution Mode | 2B | [Once, Periodic, SoC event, Key-on, Key-off] | Once\Periodic - once or periodic safety operations. SoC event - triggered by SoC by interrupt, e.g. error correction code(ECC) error and parity errors. Key-on\Key-off - runs only in the context of tests. |
| Execution Period | 4B | Time in milliseconds | Valid only when Execution Mode is Periodic |
| Execution Time limit | 4B | Time in milliseconds | If this time elapses, notify a failure of the safety operation |
| Recovery Time limit | 4B | Time in milliseconds | If this time elapses, notify a failure. |
| Threshold | 4B | Positive integer | If number of failures crosses a Threshold, a host or a MCU will be notified. |
| Notification | 2B | [HOST, MCU, MainCPU, None] | HOST - the result will be notified to HOST MCU - the result will be notified to MCU MainCPU - - the result will be notified to MainCPU None - the result is not notified to anybody. |
| Arguments | variable | [ . . . ] | A list of arguments specific to the safety operation. |

As illustrated in FIG. 3, the safety operation configuration 233 and the list of safety operations 231 may be provided by a first party. The safety operation configuration 233 may be used to configure selected ones of the list of safety operations 231 by a second party different from the first party to obtain the configured safety operations 235, which may be stored in the storage 203 as well.

For example, the configured safety operations 235 may include the following security operations, where ID 1 may be an ECC correctable error, ID 2 may be an ECC uncorrectable error, ID3, ID4, and ID5 may be MBIST.

| ID | Enable | Severity | Fail mode | Recovery | Execution Mode | Exe Period | R-Time limit | Notify | Arguments |
| --- | --- | --- | --- | --- | --- | --- | --- | --- | --- |
| 1 | True | Warning | Operational | Default | SoC event | — | 50 | None | — |
| 2 | True | Error | Operational | Default | SoC event | — | 50 | HOST | — |
| 3 | True | Error | Safe | User | Periodic | 150 | | HOST | regular-test |
| 4 | True | Error | Safe | User | Key-on | — | | HOST | sanity-test |
| 5 | True | Error | Safe | User | Key-off | — | | HOST | full-test |

In embodiments, the safety operation scheduler 211 may schedule safety operations of the configured safety operations 235 to be performed on the one or more device components, e.g., the device component 205, the device component 241, the device component 243, or the device component 245. In some embodiments, the safety operation scheduler 211 may schedule the safety operations of the configured safety operations 235 to be performed periodically on the one or more device components, e.g., the device component 205, the device component 241, the device component 243, or the device component 245. The safety operation scheduler 211 may further perform the scheduled safety operations on the one or more device components, receive an error message from the one or more device components, and monitor a failure from the one or more device components.

In addition, the error handler 213 may respond to the error message, perform recovery from the failure, and notify a host, e.g., the device component 243, or a platform processor, e.g., the device component 245, the failure based on the error message. In embodiments, the error message may have a plurality of severities including a critical error, a normal error, a warning, or an information. The host, e.g., the device component 243, or the platform processor, e.g., the device component 245, may be notified when the error message has a critical error.

Figure 4:
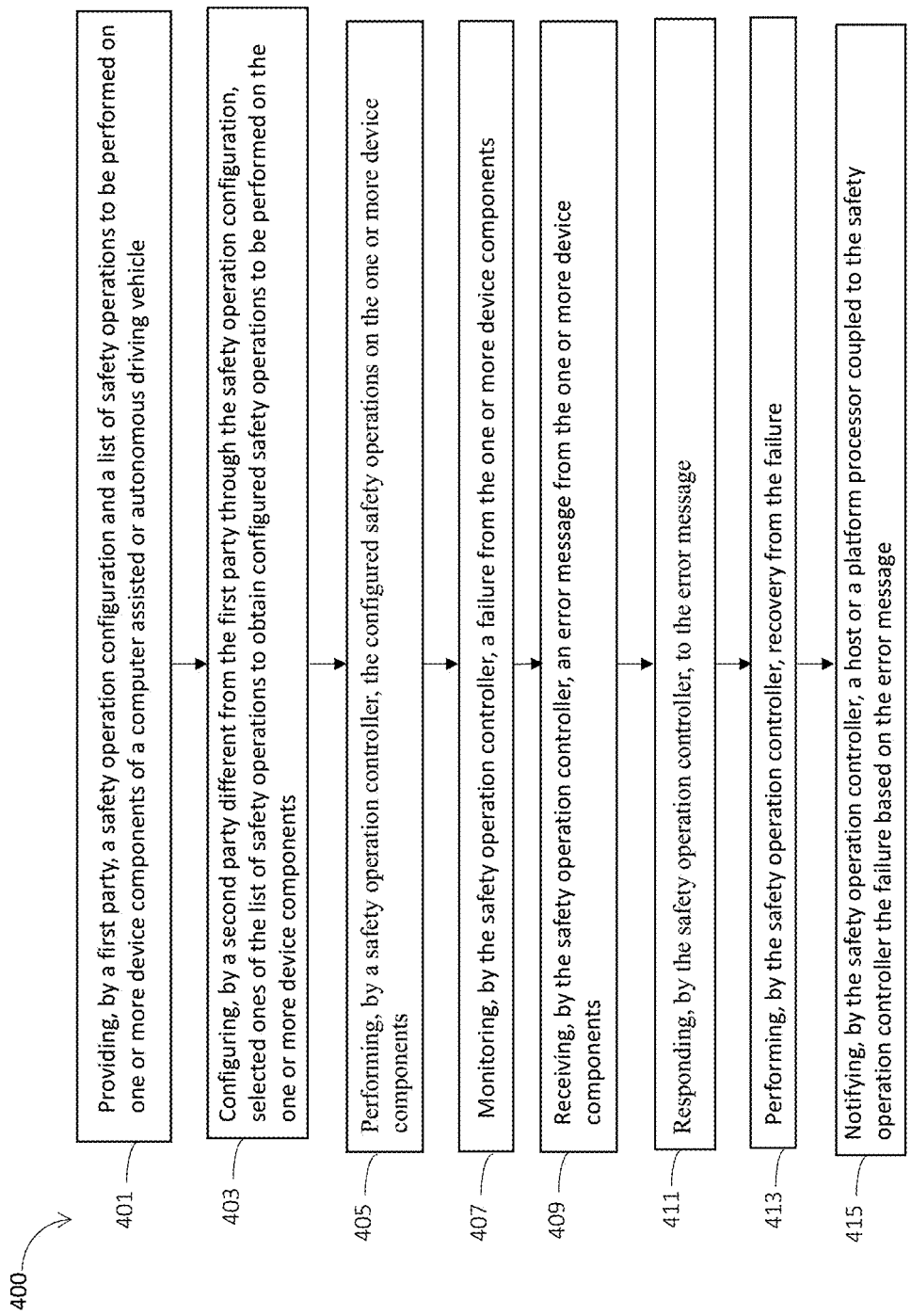
FIG. 4 illustrates another example process for safety operations to be performed by an apparatus for computer assisted or autonomous driving, in accordance with various embodiments.

FIG. 4 illustrates another example process 400 for safety operations to be performed by an apparatus for computer assisted or autonomous driving, in accordance with various embodiments. In embodiments, the process 400 may be a process performed by apparatus 100 in FIG. 1 or the apparatus 200 in FIG. 2.

The process 400 may start at an interaction 401. During the interaction 401, a safety operation configuration and a list of safety operations may be provided by a first party. The list of safety operations may be performed on one or more device components of a computer assisted or autonomous driving vehicle. For example, at the interaction 401, the safety operation configuration 233 and the list of safety operations 231 may be provided by a first party. The list of safety operations 231 may be performed on one or more device components of a computer assisted or autonomous driving vehicle, e.g., the device component 205, the device component 241, the device component 243, or the device component 245.

During an interaction 403, selected ones of the list of safety operations may be configured through the safety operation configuration by a second party different from the first party to obtain configured safety operations to be performed on the one or more device components. For example, at the interaction 403, selected ones of the list of safety operations 231 may be configured through the safety operation configuration 233 by a second party different from the first party to obtain configured safety operations 235. The configured safety operations 235 may be performed on the one or more device components, e.g., the device component 205, the device component 241, the device component 243, or the device component 245.

During an interaction 405, the configured safety operations may be performed by a safety operation controller on the one or more device components. For example, at the interaction 405, the configured safety operations 235 may be performed by the safety operation controller 201 on the one or more device components, e.g., the device component 205, the device component 241, the device component 243, or the device component 245. In some embodiments, the configured safety operations 235 may be performed by the safety operation scheduler 211 within the safety operation controller 201.

During an interaction 407, a failure from the one or more device components may be monitored by the safety operation controller. For example, at the interaction 407, a failure from the one or more device components, e.g., the device component 205, the device component 241, the device component 243, or the device component 245, may be monitored by the safety operation controller 201.

During an interaction 409, an error message from the one or more device components may be received by the safety operation controller. For example, at the interaction 409, an error message from the one or more device components, e.g., the device component 205, the device component 241, the device component 243, or the device component 245, may be received by the safety operation controller 201.

During an interaction 411, the safety operation controller may respond to the error message. For example, at the interaction 411, the safety operation controller 201 may respond to the error message.

During an interaction 413, recovery from the failure may be performed by the safety operation controller. For example, at the interaction 413, recovery from the failure may be performed by the safety operation controller 201.

During an interaction 415, a host or a platform processor coupled to the safety operation controller may be notified by the safety operation controller about the failure based on the error message. For example, a host, e.g., the device component 243, or a platform processor, e.g., the device component 245, coupled to the safety operation controller may be notified by the safety operation controller 201 about the failure based on the error message.

Figure 5:
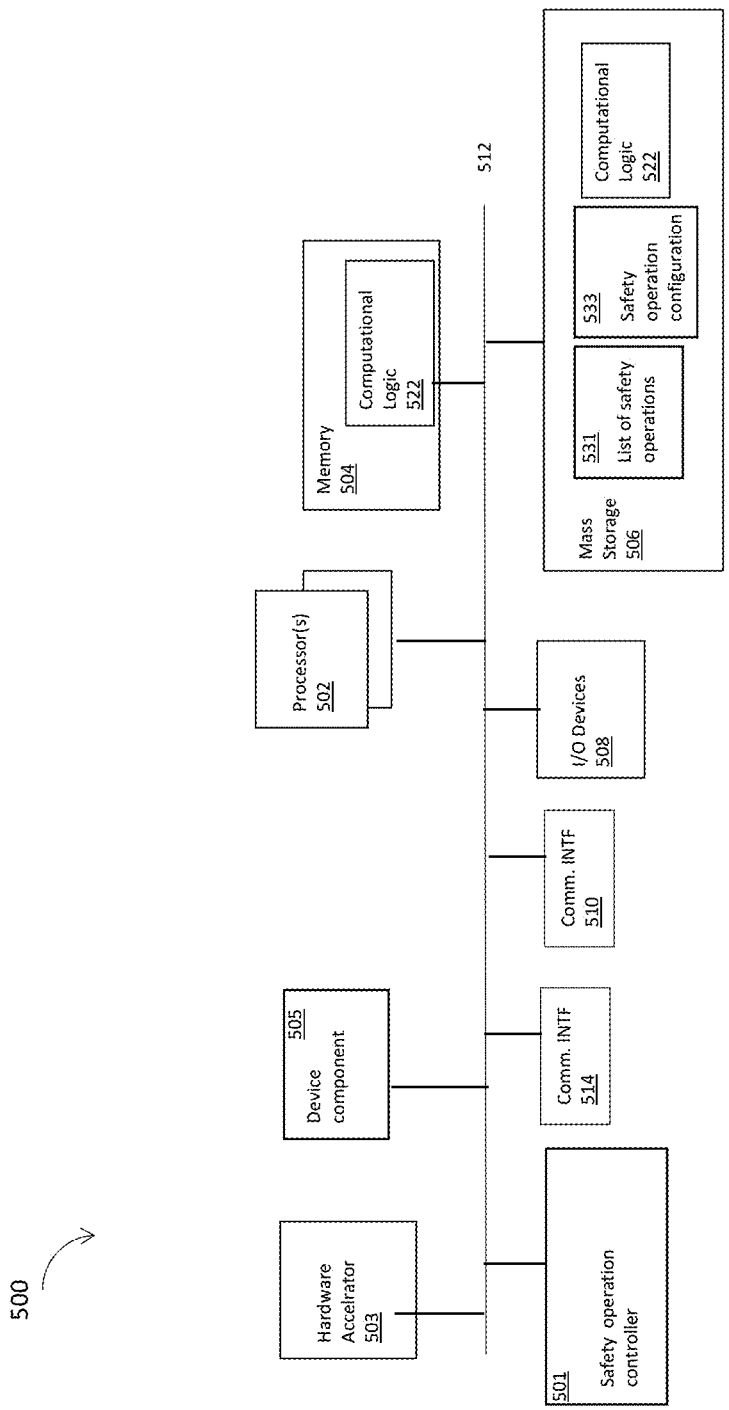
FIG. 5 illustrates an example computer device suitable for use to practice various aspects of the present disclosure, in accordance with various embodiments.

FIG. 5 illustrates an example computer device 500 that may be suitable as a device to practice selected aspects of the present disclosure. The device 500 may be an example of the apparatus 100, or the computer device 200, as shown in FIG. 1 and FIG. 2, or a VECD shown in FIG. 7. As shown, the device 500 may include one or more processors 502, each having one or more processor cores, or and optionally, a hardware accelerator 503 (which may be an ASIC or a FPGA). In alternate embodiments, the hardware accelerator 503 may be part of processor 502, or integrated together on a SOC. Additionally, the device 500 may include a memory 504, which may be any one of a number of known persistent storage medium, and mass storage 506. In addition, the 500 may include input/output devices 508. Furthermore, the device 500 may include communication interfaces 510 and 514. Communication interfaces 510 and 514 may be any one of a number of known communication interfaces. The elements may be coupled to each other via system bus 512, which may represent one or more buses. In the case of multiple buses, they may be bridged by one or more bus bridges (not shown). In addition, the device 500 may include a safety operation controller 501, a device component 505, which may be an example of the safety operation controller 101 and the device component 105, or the safety operation controller 201, and the device component 205, the device component 241, the device component 243, the device component 245, as shown in FIG. 1 and FIG. 2. A list of safety operations 531 and a safety operation configuration 533 may be stored in the mass storage 506.

Each of these elements may perform its conventional functions known in the art. In particular, the safety operation controller 101 may be employed to store and host execution of programming instructions implementing the operations associated with safety operations to be performed by an apparatus for computer assisted or autonomous driving, as described in connection with FIGS. 1-4, and/or other functions, collectively referred to as computational logic 522 that provides the capability of the embodiments described in the current disclosure. The various elements may be implemented by assembler instructions supported by processor(s) 502 or high-level languages, such as, for example, C, that can be compiled into such instructions. Operations associated with safety operations and configuration of safety operations not implemented in software may be implemented in hardware, e.g., via hardware accelerator 503.

The number, capability and/or capacity of these elements 501-533 may vary, depending on the number of other devices the device 500 is configured to support. Otherwise, the constitutions of elements 501-533 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
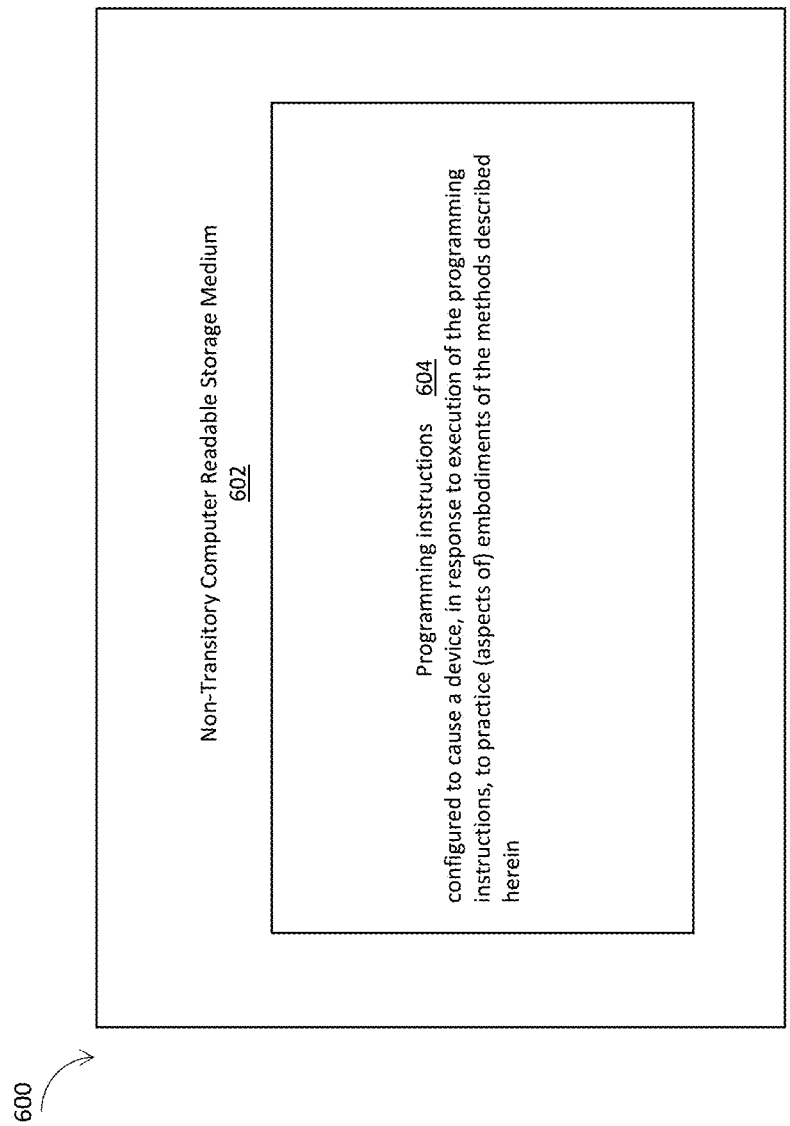
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 500, in response to execution of the programming instructions in a safety operation controller, to perform, e.g., various operations associated with the safety operation controller 101, or the safety operation controller 201, as shown in FIG. 1 and FIG. 2.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

FIG. 7 illustrates an environment 700 in which various embodiments described with references to FIGS. 1-6 may be practiced. Environment 700 includes a vehicle 701, a wireless access node 703, and a cloud computing service 705 (also referred to as "cloud 705", "the cloud 705", and the like). The vehicle 701 may be an ADV having a VECD 711 with a safety operation controller and a safety operation configuration, as illustrated in FIGS. 1-2. For illustrative purposes, the following description is provided deployment scenarios including the vehicle 701 in a two dimensional (2D) freeway/highway/roadway environment. However, the embodiments described herein are also applicable to any type of vehicle, such as trucks, buses, motorcycles, boats or motorboats, and/or any other motorized devices with a safety operation controller and a safety operation configuration, as illustrated in FIGS. 1-2. For example, water vehicles such as boats, ferries, barges, hovercrafts, etc., may interact and/or communications in a same or similar manner as the vehicle 701 (e.g., using V2X circuitry and infrastructure), and such vehicles may also implement a safety operation controller and a safety operation configuration, as illustrated in FIGS. 1-2. The embodiments described herein may also be applicable to three dimensional (3D) deployment scenarios where the vehicle 701 may be implemented as flying objects, such as aircraft, drones, unmanned aerial vehicles (UAVs), and/or to any other like motorized devices.

The vehicle 701 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 7 shows only a single vehicle 701, the vehicle 701 may represent a plurality of individual motor vehicles of varying makes, models, trim, etc., which may be collectively referred to herein as the "vehicle 701."

In embodiments, the vehicle 701, as alluded to earlier, may include the VECD 711 (e.g., the apparatus 100 shown and described with regard to FIG. 1 or the apparatus 200 shown in FIG. 2). The VECD 711 may be any type of computer device that is mounted on, built into, or otherwise embedded in a vehicle and is capable of performing safety operations by a safety operation controller and a safety operation configuration, as illustrated in FIGS. 1-2. In some embodiments, the VECD 711 may be a computer device used to control one or more systems of the vehicle 701, such as an ECU, ECM, embedded system, microcontroller, control module, EMS, OBD devices, DME, MDTs, etc.

The VECD 711 may include one or more processors (having one or more processor cores and optionally, one or more hardware accelerators), memory devices, communication devices, etc. that may be configured to carry out various functions according to the various embodiments discussed here. For example, the VECD 711 may be the computer device 500 shown in FIG. 5, and may execute instructions stored in a computer-readable medium, e.g., the computer-readable medium 602 as shown in FIG. 6, or may be pre-configured with the logic (e.g., with appropriate bit streams, logic blocks, etc.), to perform safety operations by a safety operation controller and a safety operation configuration, as illustrated in FIGS. 1-2. The various methods, procedures, processes, etc. for safety operations based on safety operation configuration is discussed infra with regard to FIGS. 1-6.

The data obtained by the VECD 711 may include sensor data from one or more sensors embedded in the vehicle 701, data packets from other VECD 711s included in other vehicles 701 (not shown), data packets and/or data streams from cloud 705 and/or network infrastructure (e.g., core network elements of a cellular communications network, etc.), navigation signaling/data from on-board navigations systems (e.g., global navigation satellite system (GNSS), global positioning system (GPS), etc.), and/or the like. In embodiments, the VECD 711 may also include, or operate in conjunction with communications circuitry and/or input/output (I/O) interface circuitry in order to obtain the data for the various sources.

The communications circuitry of the vehicle 701 may communicate with the cloud 705 via the wireless access node 703. The wireless access node 703 may be one or more hardware computer devices configured to provide wireless communication services to mobile devices (for example, VECD 711 in vehicle 701 or some other suitable device) within a coverage area or cell associated with the wireless access node 703. The wireless access node 703 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 707). Furthermore, one or more network interface controllers may be configured to transmit/receive with various network elements (e.g., one or more servers within a core network, etc.) over another backhaul connection (not shown). In embodiments, the VECD 711 may generate and transmit data to the wireless access node 703 over link 707, and the wireless access node 703 may provide the data to the cloud 705 over backhaul link 709. Additionally, during operation of the vehicle 701, the wireless access node 703 may obtain data intended for the VECD 711 from the cloud 705 over link 709, and may provide that data to the VECD 711 over link 707. The communications circuitry in the vehicle 701 may communicate with the wireless access node 703 in accordance with one or more wireless communications protocols as discussed herein.

As an example, the wireless access node 703 may be a base station associated with a cellular network (e.g., an eNB in an LTE network, a gNB in a new radio access technology (NR) network, a WiMAX base station, etc.), an RSU, a remote radio head, a relay radio device, a smallcell base station (e.g., a femtocell, picocell, home evolved nodeB (HeNB), and the like), or other like network element. In embodiments where the wireless access node is a base station, the wireless access node 703 may be deployed outdoors to provide communications for the vehicle 701 when the vehicle 701 is operating at large, for example when deployed on public roads, streets, highways, etc.

In some embodiments, the wireless access node 703 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 703 is a GW, the wireless access node 703 may be deployed in an indoor setting, such as a garage, factory, laboratory or testing facility, and may be used to provide communications for while parked, prior to sale on the open market, or otherwise not operating at large.

In embodiments, the cloud 705 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 705 may be associated with network operator who owns or controls equipment and other elements necessary to provide network-related services, such as one or more base stations or access points (e.g., wireless access node 703), one or more servers for routing digital data or telephone calls (for example, a core network or backbone network), etc. Implementations, components, and protocols used to communicate via such services may be those known in the art and are omitted herein for the sake of brevity.

In some embodiments, the cloud 705 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 705 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 705 and database systems) may coordinate the delivery of data to the VECD 711 of vehicle 701. Implementations, components, and protocols used to communicate via such services may be those known in the art and are omitted herein for the sake of brevity.

Thus various example embodiments of the present disclosure have been described including, but are not limited to:

Example 1 may include an apparatus for computer assisted or autonomous driving, comprising: a storage to store a safety operation configuration and a list of safety operations to be performed on one or more device components of a computer assisted or autonomous driving vehicle, wherein the safety operation configuration and the list of safety operations are provided by a first party, the safety operation configuration is used to configure selected ones of the list of safety operations by a second party different from the first party to obtain configured safety operations to be performed on the one or more device components; and a safety operation controller to perform the configured safety operations on the one or more device components in accordance with the configured safety operations; wherein the apparatus, including the storage and the safety operation controller, are disposed in the computer assisted or autonomous driving vehicle.

Example 2 may include the apparatus of example 1 and/or some other examples herein, wherein the list of safety operations includes memory built-in-self-test (MBIST) operations, logic built-in-self-test (LBIST) operations, error injection operations, voltage monitoring operations, temperature monitoring operations, clock monitoring operations, software redundancy operations, or software test libraries operations.

Example 3 may include the apparatus of example 1 and/or some other examples herein, wherein the configured safety operations further include a configured safety operation added to the list of safety operations by the second party using the safety operation configuration.

Example 4 may include the apparatus of example 1 and/or some other examples herein, wherein the safety operation configuration is used to turn off safety operations on a device component of the one or more device components.

Example 5 may include the apparatus of any one of examples 1-4 and/or some other examples herein, wherein the safety operation configuration is provided as an application programming interface (API).

Example 6 may include the apparatus of any one of examples 1-4 and/or some other examples herein, wherein at least some of the one or more device components and the safety operation controller are on a same system-on-chip, and the at least some of the one or more device components include one or more intellectual property (IP) cores.

Example 7 may include the apparatus of any one of examples 1-4 and/or some other examples herein, wherein a device component of the one or more device components is a host, or a platform processor, and the host or the platform processor being on a same circuit board as the safety operation controller.

Example 8 may include the apparatus of any one of examples 1-4 and/or some other examples herein, wherein the one or more device components include one or more device components selected from a central processing unit (CPU), a direct memory access (DMA), a faultRobust network (FRNET), a universal asynchronous receiver-transmitter (UART), a general-purpose input/output (GPIO), a serial peripheral interface (SPI), an inter-integrated circuit (I2C), a camera, an embedded MultiMediaCard (EMMC), a voltage monitor, a clock monitor, or a temperature monitor; and the one or more device components are Automotive Safety Integrity Level D (ASIL-D) certificated.

Example 9 may include the apparatus of any one of examples 1-4 and/or some other examples herein, wherein the storage is a replaceable flash memory coupled to the safety operation controller.

Example 10 may include the apparatus of any one of examples 1-4 and/or some other examples herein, wherein the safety operation controller includes a safety operation scheduler and an error handler, and wherein the safety operation scheduler is to: schedule safety operations of the configured safety operations on the one or more device components to be performed, perform the scheduled safety operations on the one or more device components, receive an error message from the one or more device components, and monitor a failure from the one or more device components; and the error handler is to: respond to the error message, perform recovery from the failure, and notify a host or a platform processor the failure based on the error message.

Example 11 may include the apparatus of example 10 and/or some other examples herein, wherein the safety operation scheduler is to schedule the safety operations of the configured safety operations to be performed periodically on the one or more device components.

Example 12 may include the apparatus of any one of examples 1-4 and/or some other examples herein, wherein the safety operation controller is to further: monitor a failure from the one or more device components; receive an error message from the one or more device components; respond to the error message; perform recovery from the failure; and notify a host or a platform processor the failure based on the error message.

Example 13 may include the apparatus of example 12 and/or some other examples herein, wherein the error message has a plurality of severities including a critical error, a normal error, a warning, or an information.

Example 14 may include the apparatus of example 13 and/or some other examples herein, wherein the host or the platform processor is notified when the error message has a critical error.

Example 15 may include a method for safety operations for computer assisted or autonomous driving, comprising: providing, by a first party, a safety operation configuration and a list of safety operations to be performed on one or more device components of a computer assisted or autonomous driving vehicle; configuring, by a second party different from the first party through the safety operation configuration, selected ones of the list of safety operations to obtain configured safety operations to be performed on the one or more device components; performing, by a safety operation controller, the configured safety operations on the one or more device components; monitoring, by the safety operation controller, a failure from the one or more device components; receiving, by the safety operation controller, an error message from the one or more device components; responding, by the safety operation controller, to the error message; performing, by the safety operation controller, recovery from the failure; and notifying, by the safety operation controller, a host or a platform processor coupled to the safety operation controller the failure based on the error message.

Example 16 may include the method of example 15 and/or some other examples herein, wherein the list of safety operations includes memory built-in-self-test (MBIST) operations, logic built-in-self-test (LBIST) operations, error injection operations, voltage monitoring operations, temperature monitoring operations, clock monitoring operations, software redundancy operations, or software test libraries operations.

Example 17 may include the method of any one of examples 15-16 and/or some other examples herein, wherein the configured safety operations further include a configured safety operation added to the list of safety operations by the second party using the safety operation configuration.

Example 18 may include the method of any one of examples 15-16 and/or some other examples herein, wherein at least some of the one or more device components and the safety operation controller are on a same system-on-chip, and the at least some of one or more device components include one or more intellectual property (IP) cores.

Example 19 may include the method of any one of examples 15-16 and/or some other examples herein, wherein a device component of the one or more device components is a host, or a platform processor, the host or the platform processor being on a same circuit board as the safety operation controller, or a software component to be operated on the safety operation controller.

Example 20 may include the method of any one of examples 15-16 and/or some other examples herein, wherein the one or more device components includes one or more device components selected from a central processing unit (CPU), a direct memory access (DMA), a faultRobust network (FRNET), a universal asynchronous receiver-transmitter (UART), a general-purpose input/output (GPIO), a serial peripheral interface (SPI), an inter-integrated circuit (I2C), a camera, an embedded MultiMediaCard (EMMC), a voltage monitor, a clock monitor, or a temperature monitor; and the one or more device components are Automotive Safety Integrity Level D (ASIL-D) certificated.

Example 21 may include an apparatus for computer assisted or autonomous driving, comprising: a storage to store a safety operation configuration and a list of safety operations to be performed on one or more device components of a computer assisted or autonomous driving vehicle, wherein the safety operation configuration and the list of safety operations are provided by a first party, the safety operation configuration is used to configure selected ones of the list of safety operations by a second party different from the first party to obtain configured safety operations to be performed on the one or more device components; and a safety operation controller to perform the configured safety operations on the one or more device components in accordance with the configured safety operations, wherein the safety operation controller includes a safety operation scheduler and an error handler, and wherein the safety operation scheduler is to: perform the configured safety operations on the one or more device components, receive an error message from the one or more device components, and monitor a failure from the one or more device components; and the error handler is to: respond to the error message, perform recovery from the failure, and notify a host or a platform processor the failure based on the error message; wherein the apparatus, including the storage and the safety operation controller, are disposed in the computer assisted or autonomous driving vehicle.

Example 22 may include the apparatus of example 21 and/or some other examples herein, wherein the list of safety operations includes memory built-in-self-test (MBIST) operations, logic built-in-self-test (LBIST) operations, error injection operations, voltage monitoring operations, temperature monitoring operations, clock monitoring operations, software redundancy operations, or software test libraries operations.

Example 23 may include the apparatus of any one of examples 21-22 and/or some other examples herein, wherein at least some of the one or more device components and the safety operation controller are on a same system-on-chip, and the at least some of one or more device components include one or more intellectual property (IP) cores.

Example 24 may include the apparatus of any one of examples 21-22 and/or some other examples herein, wherein a device component of the one or more device components is a host, or a platform processor, the host or the platform processor being on a same circuit board as the safety operation controller, or a software component to be operated on the safety operation controller.

Example 25 may include the apparatus of any one of examples 21-22 and/or some other examples herein, wherein the one or more device components includes one or more device components selected from a central processing unit (CPU), a direct memory access (DMA), a faultRobust network (FRNET), a universal asynchronous receiver-transmitter (UART), a general-purpose input/output (GPIO), a serial peripheral interface (SPI), an inter-integrated circuit (I2C), a camera, an embedded MultiMediaCard (EMMC), a voltage monitor, a clock monitor, or a temperature monitor;

and the one or more device components are Automotive Safety Integrity Level D (ASIL-D) certificated.

Example 26 may include one or more computer-readable media having instructions for safety operations for computer assisted or autonomous driving, upon execution of the instructions by one or more processors, to perform the method of any one of examples 15-20.

Example 27 may include an apparatus for safety operations for computer assisted or autonomous driving, comprising: means for providing, by a first party, a safety operation configuration and a list of safety operations to be performed on one or more device components of a computer assisted or autonomous driving vehicle; means for configuring, by a second party different from the first party through the safety operation configuration, selected ones of the list of safety operations to obtain configured safety operations to be performed on the one or more device components; means for performing the configured safety operations on the one or more device components; means for monitoring a failure from the one or more device components; means for receiving an error message from the one or more device components; means for responding to the error message; means for performing recovery from the failure; and means for notifying a host or a platform processor the failure based on the error message.

Example 28 may include the apparatus of example 27 and/or some other examples herein, wherein the list of safety operations includes memory built-in-self-test (MBIST) operations, logic built-in-self-test (LBIST) operations, error injection operations, voltage monitoring operations, temperature monitoring operations, clock monitoring operations, software redundancy operations, or software test libraries operations.

Example 29 may include the apparatus of any one of examples 27-28 and/or some other examples herein, wherein the configured safety operations further include a configured safety operation added to the list of safety operations by the second party using the safety operation configuration.

Example 30 may include the apparatus of any one of examples 27-28 and/or some other examples herein, wherein at least some of the one or more device components and the means for performing the configured safety operations are on a same system-on-chip, and the at least some of one or more device components include one or more intellectual property (IP) cores.

Example 31 may include the apparatus of any one of examples 27-28 and/or some other examples herein, wherein a device component of the one or more device components is a host, or a platform processor, the host or the platform processor being on a same circuit board as the means for performing the configured safety operations, or a software component to be operated on the means for performing the configured safety operations.

Example 32 may include the apparatus of any one of examples 27-28 and/or some other examples herein, wherein the one or more device components includes one or more device components selected from a central processing unit (CPU), a direct memory access (DMA), a faultRobust network (FRNET), a universal asynchronous receiver-transmitter (UART), a general-purpose input/output (GPIO), a serial peripheral interface (SPI), an inter-integrated circuit (I2C), a camera, an embedded MultiMediaCard (EMMC), a voltage monitor, a clock monitor, or a temperature monitor; and the one or more device components are Automotive Safety Integrity Level D (ASIL-D) certificated.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for computer assisted or autonomous driving, comprising:
    a device component disposed in a computer assisted or autonomous driving vehicle;
    a storage disposed in the vehicle to store a list of safety operations to be selectively configured and performed on the device component, and a safety operation configuration to selectively enable and configure a subset of the safety operations to obtain configured safety operations stored in the storage and selected for performance on the device component; and
    a safety operation controller disposed in the vehicle to cause the configured safety operations to be performed on the device component;
    wherein to selectively enable and configure the subset of the safety operations to obtain the configured safety operations, the safety operation configuration is arranged to configure an enable field of a selected one of the safety operations to denote the selected safety operation is enabled, and to configure, for each enabled safety operation, possible values for an execution mode, an error severity level, a fail mode, and a notification field, resulting in each of the configured safety operations having an identifier to identify the corresponding safety operation, an enable field value denoting that the safety operation is enabled, an execution mode value denoting whether the safety operation is to be performed once, periodically, or in response to an event, an error severity value denoting an error severity level of a failure of the safety operation when performed, a fail mode value denoting whether recovery is to be attempted on failure of the safety operation when performed, and a notification field value denoting a host or processor to be notified of a failure of the safety operation when performed.

2. The apparatus of claim 1, wherein the list of safety operations includes memory built-in-self-test (MBIST) operations, logic built-in-self-test (LBIST) operations, error injection operations, voltage monitoring operations, temperature monitoring operations, or clock monitoring operations.

3. The apparatus of claim 1, wherein the device component and the safety operation controller are on a same system-on-chip, and the device component includes one or more intellectual property (IP) cores.

4. The apparatus of claim 1, wherein the device component is the host or processor, and the host or processor is on a same circuit board as the safety operation controller.

5. The apparatus of claim 1, wherein the device component is Automotive Safety Integrity Level D (ASIL-D) certificated.

6. The apparatus of claim 1, wherein the storage is a replaceable flash memory coupled to the safety operation controller.

7. The apparatus of claim 1, wherein the safety operation controller includes a safety operation scheduler and an error handler, and wherein the safety operation scheduler is to:
    schedule performance of the configured safety operations on the device component,
    cause the scheduled safety operations to be performed on the device component, receive any error message output by the device component, and
monitor for failure of any of the configured safety operations performed on the device component;
and the error handler is to:
respond to the error message or messages, if any,
attempt to perform recovery from a failure if detected, and
notify the host or processor of the failure.

8. The apparatus of claim 1, wherein the safety operation controller is to further:
monitor for failure of any of the configured safety operations performed on the device component;
receive any error message output by component;
respond to the error message or messages, if any;
attempt to perform recovery from a failure, if detected; and
notify the host or processor of the failure.

9. The apparatus of claim 1, wherein the error severity level is a selected one of a critical error, a normal error, a warning, or an information notice.

10. The apparatus of claim 1, wherein each of the configured safety operations further includes an execution time threshold value indicating an execution time limit beyond which the corresponding configured safety operation is to notify the host or processor of the failure.

11. The apparatus of claim 1, wherein each of the configured safety operations further includes a recovery time threshold value indicating a recovery time limit beyond which the corresponding configured safety operation is to notify the host or processor of the failure.

12. A method for safety operations for computer assisted or autonomous driving, comprising:
providing a computer assisted or autonomous driving (CA/AD) vehicle with a device component; and
storing in a storage of the CA/AD vehicle a list of safety operations and a safety operation configuration;
wherein the safety operation configuration is used to enable and configure selected ones of the list of safety operations to obtain configured safety operations stored in the storage and selected for performance on the device component, including configuring an enable field of a selected one of the safety operations to denote the selected safety operation is enabled, and configuring, for each enabled safety operation, possible values for an execution mode, an error severity level, a fail mode, and a notification field, resulting in each of the configured safety operations having an identifier to identify the corresponding safety operation, an enable field value denoting that the safety operation is enabled, an execution mode value denoting whether the safety operation is to be performed once, periodically, or in response to an event, an error severity value denoting an error severity level of a failure of the safety operation when performed, a fail mode value denoting whether recovery is to be attempted on failure of the safety operation when performed, and a notification field value denoting a host or processor is to be notified of a failure of the safety operation when performed;
and providing a safety operation controller of the CA/AD vehicle to:
cause the configured safety operations to be performed on the device component;
detect for failure of any of the configured safety operations when performed; and
notify the host or processor of the failure, if detected.

13. The method of claim 12, wherein the list of safety operations includes memory built-in-self-test (MBIST) operations, logic built-in-self-test (LBIST) operations, error injection operations, voltage monitoring operations, temperature monitoring operations, or clock monitoring operations.

14. The method of claim 12, wherein the device component and at least one other device component are on a same system-on-chip, and the at least some of device components include one or more intellectual property (IP) cores.

15. The method of claim 12, wherein the device component is the host or processor.

16. The method of claim 12, wherein the device component is Automotive Safety Integrity Level D (ASIL-D) certificated.

17. An apparatus for computer assisted or autonomous driving (CA/AD), comprising:
a storage disposed in a CA/AD vehicle to store a safety operation configuration and a list of safety operations, wherein the safety operation configuration is to be used to enable and configure selected ones of the list of safety operations to obtain configured safety operations for performance on a device component of the CA/AD vehicle, wherein to selectively enable and configure the selected ones of the safety operations to obtain the configured safety operations, the safety operation configuration is arranged to configure an enable field of a selected one of the safety operations to denote the selected safety operation is enabled, and to configure, for each enabled safety operation, possible values for an execution mode, an error severity level, a fail mode, and a notification field, resulting in each of the configured safety operations having an identifier to identify the corresponding safety operation, an enable field value denoting that the safety operation is enabled, an execution mode value denoting whether the safety operation is to be performed once, periodically, or in response to an event, an error severity value denoting an error severity level of a failure of the safety operation when performed, a fail mode value denoting whether recovery is to be attempted on failure of the safety operation when performed, and a notification field value denoting a host or processor to be notified of a failure of the safety operation when performed; and
a safety operation controller disposed in the CA/AD vehicle to cause the configured safety operations to be performed on the device component.

18. The apparatus of claim 17, wherein the list of safety operations includes memory built-in-self-test (MBIST) operations, logic built-in-self-test (LBIST) operations, error injection operations, voltage monitoring operations, temperature monitoring operations, or clock monitoring operations.

19. The apparatus of claim 17, wherein the device component and the safety operation controller are on a same system-on-chip, and the device component includes one or more intellectual property (IP) cores.

20. The apparatus of claim 17, wherein the device component is the host or processor, the host or processor being on a same circuit board as the safety operation controller.

21. The apparatus of claim 17, wherein the device component is Automotive Safety Integrity Level D (ASIL-D) certificated.

22. The apparatus of claim 17, wherein each of the configured safety operations further includes an execution time threshold value indicating an execution time limit beyond which the corresponding configured safety operation is to notify the host or processor of the failure.

23. The apparatus of claim 17, wherein each of the configured safety operations further includes a recovery time threshold value indicating a recovery time limit beyond which the corresponding configured safety operation is to notify the host or processor of the failure.

\* \* \* \* \*